United States Patent
Wilson et al.

(10) Patent No.: US 9,851,219 B2
(45) Date of Patent: Dec. 26, 2017

(54) METHODS AND SYSTEMS FOR ROUTE-BASED SCROLLING OF A NAVIGATIONAL MAP

(75) Inventors: Blake Wilson, Peoria, AZ (US); Roger W. Burgin, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 2386 days.

(21) Appl. No.: 12/500,432

(22) Filed: Jul. 9, 2009

(65) Prior Publication Data
US 2011/0010082 A1 Jan. 13, 2011

(51) Int. Cl.
*G01C 21/04* (2006.01)
*G01C 21/10* (2006.01)
(Continued)

(52) U.S. Cl.
CPC .............. *G01C 23/00* (2013.01); *G01C 21/20* (2013.01); *G01C 21/26* (2013.01); *G08G 1/20* (2013.01); *B60R 25/33* (2013.01); *G01S 19/35* (2013.01); *G08G 5/0021* (2013.01); *G08G 5/0052* (2013.01); *G08G 5/0086* (2013.01)

(58) Field of Classification Search
USPC ... 701/200, 527, 4, 120, 408–410, 116, 400, 701/532, 16, 18, 468, 517, 14, 431; 345/20, 22, 418, 427, 1.1–3.4, 629; 340/419, 855, 996.27, 971, 945, 990, 340/995.1–995.28, 951, 972, 961; 342/46, 176, 36; 73/178; 715/805, 855, 715/859, 862
See application file for complete search history.

(56) References Cited

U.S. PATENT DOCUMENTS 3,652,836 A * 3/1972 Richardson et al. ......... 701/410
3,668,623 A * 6/1972 Csaposs ....................... 340/976
(Continued)

FOREIGN PATENT DOCUMENTS

| EP | 0660289 A1 | 6/1995 |
| JP | 2000292180 A | 10/2000 |

(Continued)

OTHER PUBLICATIONS

Design of Intelligent In-vehicle Navigation Systems for Dynamic Route Guidance with Real-time Information; Zhaosheng Yang; Lin Zhang; Jian Wang; Yuan Wang; Qing Guan; Jinqiao Feng; Vehicular Electronics and Safety, 2006. ICVES 2006. IEEE Inter. Conf. on; Digital Object Id.: 10.1109/ICVES.2006.371579; Pub. Year: 2006, pp. 184-188.*

(Continued)

*Primary Examiner* — Cuong H Nguyen
(74) *Attorney, Agent, or Firm* — Lorenz & Kopf, LLP

(57) ABSTRACT

Methods and systems are provided for indicating the relationship of a displayed area on a map with respect to a route or flight plan. A method comprises displaying a navigational map on a display device and displaying a graphical adjustment element on the display device. The position of the graphical adjustment element on the display device corresponds to the along track distance between the displayed area of the navigational map and a first navigational reference point of a route comprising the first navigational reference point and a second navigational reference point.

20 Claims, 6 Drawing Sheets

(51) Int. Cl.

| | | |
|---|---|---|
| G01C 23/00 | (2006.01) | |
| G01C 21/20 | (2006.01) | |
| G08G 1/00 | (2006.01) | |
| G01C 21/26 | (2006.01) | |
| B60R 25/33 | (2013.01) | |
| G01S 19/35 | (2010.01) | |
| G08G 5/00 | (2006.01) | |

(56) References Cited

U.S. PATENT DOCUMENTS

| | | | | |
|---|---|---|---|---|
| 4,673,929 | A | * | 6/1987 | Nelson et al. ............ 345/22 |
| 4,692,869 | A | * | 9/1987 | King et al. ............ 701/467 |
| 4,803,464 | A | * | 2/1989 | Holmes et al. ............ 345/20 |
| 5,041,982 | A | | 8/1991 | Rathnam |
| 5,184,123 | A | * | 2/1993 | Bremer et al. ............ 340/995.27 |
| 5,369,589 | A | * | 11/1994 | Steiner ............ 701/538 |
| 5,978,715 | A | * | 11/1999 | Briffe et al. ............ 701/11 |
| 5,995,901 | A | | 11/1999 | Owen et al. |
| 6,023,652 | A | * | 2/2000 | Arakawa et al. ............ 701/454 |
| 6,038,498 | A | * | 3/2000 | Briffe et al. ............ 701/3 |
| 6,112,141 | A | * | 8/2000 | Briffe et al. ............ 701/14 |
| 6,122,592 | A | * | 9/2000 | Arakawa et al. ............ 701/426 |
| 6,314,370 | B1 | | 11/2001 | Curtright |
| 6,320,579 | B1 | * | 11/2001 | Snyder et al. ............ 345/419 |
| 6,353,794 | B1 | | 3/2002 | Davis et al. |
| 6,389,355 | B1 | | 5/2002 | Gibbs et al. |
| 6,748,319 | B2 | * | 6/2004 | Aoki et al. ............ 701/527 |
| 6,799,095 | B1 | | 9/2004 | Owen et al. |
| 7,127,348 | B2 | * | 10/2006 | Smitherman et al. ............ 701/409 |
| 7,209,070 | B2 | * | 4/2007 | Gilliland et al. ............ 342/26 B |
| 7,230,632 | B2 | | 6/2007 | Coldefy et al. |
| 7,239,311 | B2 | * | 7/2007 | Dunn et al. ............ 345/419 |
| 7,382,288 | B1 | * | 6/2008 | Wilson et al. ............ 340/972 |
| 7,403,843 | B2 | | 7/2008 | Gremmert |
| 7,417,641 | B1 | | 8/2008 | Barber et al. |
| 7,519,471 | B2 | * | 4/2009 | Shibata et al. ............ 701/523 |
| 7,636,627 | B2 | * | 12/2009 | Tajima et al. ............ 701/431 |
| 7,636,629 | B2 | * | 12/2009 | Tajima et al. ............ 701/431 |
| 7,725,258 | B2 | * | 5/2010 | Smitherman ............ 701/514 |
| 7,801,675 | B2 | * | 9/2010 | Currie et al. ............ 701/418 |
| 7,844,394 | B2 | * | 11/2010 | Kim ............ 701/412 |
| 7,852,236 | B2 | * | 12/2010 | Feyereisen et al. ............ 340/971 |
| 7,853,403 | B2 | * | 12/2010 | Tanaka ............ 701/414 |
| 7,904,238 | B2 | * | 3/2011 | Nesbitt ............ 701/420 |
| 7,979,201 | B2 | * | 7/2011 | Machino ............ 701/413 |
| 8,099,202 | B1 | * | 1/2012 | Krenz et al. ............ 701/16 |
| 2004/0061726 | A1 | * | 4/2004 | Dunn et al. ............ 345/855 |
| 2004/0167709 | A1 | * | 8/2004 | Smitherman et al. ............ 701/208 |
| 2004/0239550 | A1 | * | 12/2004 | Daly, Jr. ............ 342/26 B |
| 2006/0005147 | A1 | * | 1/2006 | Hammack et al. ............ 715/805 |
| 2007/0046448 | A1 | * | 3/2007 | Smitherman ............ 340/431 |
| 2008/0033633 | A1 | * | 2/2008 | Akiyoshi et al. ............ 701/201 |
| 2008/0114535 | A1 | * | 5/2008 | Nesbitt ............ 701/202 |
| 2009/0125163 | A1 | * | 5/2009 | Duggan et al. ............ 701/2 |
| 2009/0291418 | A1 | * | 11/2009 | Srivastav et al. ............ 434/43 |
| 2011/0010082 | A1 | * | 1/2011 | Wilson et al. ............ 701/200 |

FOREIGN PATENT DOCUMENTS

| | | |
|---|---|---|
| JP | 2003177028 A | 6/2003 |
| JP | 2008249463 A | 10/2008 |

OTHER PUBLICATIONS

Airborne Vehicle Mapping of Curvilinear Objects Using 2-D Splinegon; Lazarus, S.; Tsourdos, A.; White, B.A.; Silson, P.M.G.; Żbikowski, R.; Instrumentation and Measurement, IEEE Transactions on; vol. 59 , Issue: 7; Digital Object Identifier: 10.1109/TIM.2009.2028760; Publication Year: 2010 , pp. 1941-1954.*

On predicting vehicle tracks; Xiaowen Gong; Manoharan, S.; Communications, Computers and Signal Processing (PacRim), 2011 IEEE Pacific Rim Conference on; Digital Object Identifier: 10.1109/PACRIM.2011.6032863; Publication Year: 2011 , pp. 31-36.*

Real-time dense digital elevation map estimation using laserscanner and camera SLAM process; Malartre, F.; Delmas, P.; Chapuis, R.; Debain, C.; Control Automation Robotics & Vision (ICARCV), 2010 11th International Conference on; Digital Object Identifier: 10.1109/ICARCV.2010.5707900; Publication Year: 2010 , pp. 1212-1218.*

ROV based tool sled for the placement of fiber optic cable between benthic instrument nodes; Bird, L.E.; OCEANS '02 MTS/IEEE vol. 4; Digital Object Identifier: 10.1109/OCEANS.2002.1191947; Publication Year: 2002 , pp. 2050-2053 vol. 4.*

Velocity-dependent dynamic curvature gain for redirected walking; Neth, C.T.; Souman, J.L.; Engel, D.; Kloos, U.; Bulthoff, H.H.; Mohler, B.J.'; Virtual Reality Conference (VR), 2011 IEEE; Digital Object Identifier: 10.1109/VR.2011.5759454 Publication Year: 2011 , pp. 151-158.*

Flight management of multiple aerial vehicles using genetic algorithms; Kanury, S.; Song, Y.D.; System Theory, 2006. SSST '06. Proceeding of the Thirty-Eighth Southeastern Symposium on; Digital Object Identifier: 10.1109/SSST.2006.1619100 Publication Year: 2006 , pp. 33-37.*

Assessment of controller situation awareness in future terminal RNAV operations; Smith, E.C.; Digital Avionics Systems Conference, 2007. DASC '07. IEEE/AIAA 26$^{th}$; Digital Object Identifier: 10.1109/DASC.2007.4391954; Publication Year: 2007 , pp. 6.B.3-1-6.B.3-13.*

Flight simulator evaluation of an integrated synthetic and enhanced vision system for terrain avoidance; Schnell, T. ; Ellis, K. ; Etherington, Tim; Digital Avionics Systems Conference, 2005. DASC 2005. The 24$^{th}$; vol. 1 Digital Object Identifier: 10.1109/DASC.2005.1563371; Publication Year: 2005 , pp. 4.E.4-41-18 vol. 1.*

Synthetic vision: a prototype display concept for commercial aircraft ; Theunissen, E. ; Rademaker, R.M. ; Etherington, T.J. Aerospace and Electronic Systems Magazine, IEEE; vol. 17 , Issue: 10; Digital Object Identifier: 10.1109/MAES.2002.1044511 Publication Year: 2002 , pp. 13-18.*

En-route descent trajectory synthesis for air traffic control automation; Slattery, R.A. ; Zhao, Y.;American Control Conference, Proceedings of the 1995; vol. 5 ; Digital Object Identifier: 10.1109/ACC.1995.532248 Publication Year: 1995 , pp. 3430-3434 vol. 5.*

Whitlow, S. et al., System and Methods for Displaying Video with Improved Spatial Awareness, filed Mar. 4, 2009 and assigned U.S. Appl. No. 12/398,002.

Wilson, B. et al., Methods and Systems for Displaying a Vertical Profile for an Aircraft Procedure with Nonuniform Scaling, filed Apr. 21, 2009 and assigned U.S. Appl. No. 12/427,521.

Chytil, M. et al., Methods and Systems for Updating a Map in Response to Selection of Content for Display on the Map, filed Apr. 29, 2009 and assigned U.S. Appl. No. 12/432,578.

EP Search Report for 10 167 593.2 dated Apr. 8, 2013.

EP Examination Report for 10 167 593.2 dated Nov. 15, 2013.

EP Examination Report for 10 167 593.2 dated Nov. 10, 2014.

\* cited by examiner

METHODS AND SYSTEMS FOR ROUTE-BASED SCROLLING OF A NAVIGATIONAL MAP

TECHNICAL FIELD

The subject matter described herein relates generally to avionics systems, and more particularly, embodiments of the subject matter relate to avionics systems and related cockpit displays adapted for scrolling a navigational map based on a flight plan.

BACKGROUND

Modern electronic displays for vehicles (such as aircraft, automobiles, marine vessels, or trains) display a considerable amount of information, such as vehicle position, navigation and terrain information. In the case of an aircraft, many modern flight deck displays (or cockpit displays) include a lateral view, generally known as a lateral map display, which is basically a top-down view of the flight plan that may include, for example, a top-down view aircraft symbol, terrain information, political boundaries, navigation aids and/or waypoint symbols, line segments that interconnect the waypoint symbols, and range rings. Often, it may be desirable to view flight-related information in the lateral view for areas of the flight plan that are either ahead of and/or behind the current location of the aircraft within the flight plan. In prior art systems, a user (e.g., a pilot and/or co-pilot) may manually adjust the area displayed in the lateral map display by scrolling the map in either a lateral direction (e.g., up or down, left or right) or a cardinal direction (e.g., North or South, East or West), or by manually dragging the map to a desired area. However, in some situations, adjusting the area displayed in the lateral map in the proper direction can be difficult and/or nonintuitive, for example, when the lateral map is oriented in the direction of travel (e.g., heading up) or when the flight plan turns in a direction that is not evident by the current state of the lateral map display. In addition, it is difficult to adjust the lateral map display diagonally and/or in a non-cardinal direction. As a result, repositioning the lateral map display may undesirably increase the workload on the pilot and/or co-pilot.

BRIEF SUMMARY

A method is provided for presenting, on a display device, information relating to a route comprising a first navigational reference point and a second navigational reference point. The method comprises displaying a navigational map on a display device and displaying a graphical adjustment element on the display device. The position of the graphical adjustment element on the display device corresponds to the along track distance between a displayed area of the navigational map and the first navigational reference point of the route.

In another embodiment, a method is provided for presenting information on a display device associated with a vehicle. The method comprises displaying a map on the display device and displaying a graphical adjustment path on the display device, wherein the graphical adjustment path corresponds to an along track distance from a first navigational reference point to a second navigational reference point defining a route for the vehicle. When a portion of the route is within a displayed area of the map, the method further comprises rendering a graphical adjustment element overlying the graphical adjustment path at a first position, wherein the first position with respect to the graphical adjustment path corresponds to a location of the displayed area with respect to the route.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements.

FIG. 4 is a flow diagram of an exemplary scrollbar display process suitable for use with the display process of FIG. 2 in accordance with one embodiment;

FIG. 7 is a flow diagram of an exemplary slider display process suitable for use with the display process of FIG. 2 in accordance with one embodiment;

DETAILED DESCRIPTION

Figure 1:
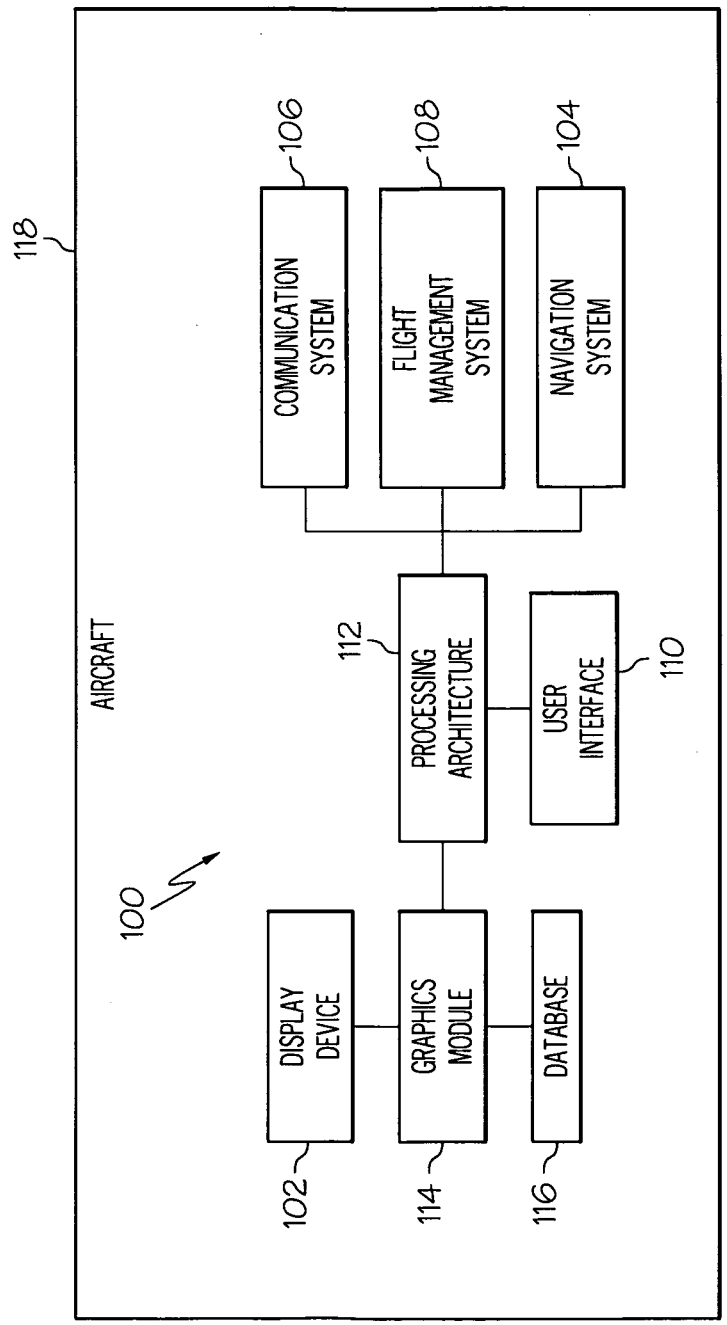
FIG. 1 is a block diagram of a display system suitable for use in an aircraft in accordance with one embodiment.

The following detailed description is merely exemplary in nature and is not intended to limit the subject matter of the application and uses thereof. Furthermore, there is no intention to be bound by any theory presented in the preceding background or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to display systems adapted for displaying, on a display device associated with an aircraft, a graphical adjustment element that allows a user to adjust (or scroll) a navigational map along the track (or path) defined by a flight plan (or travel route). A user can quickly and intuitively reposition the navigational map to view and analyze content and/or information for a portion of the flight plan (e.g., upcoming neighboring air traffic, weather conditions, and the like) and ascertain the relative real-world positioning of the aircraft with respect to the flight plan. The overall workload on the user is reduced and the graphical adjustment element is implemented in a manner that does not degrade situational awareness and enables a user to dedicate efforts to more significant tasks, such as, for example, operating the aircraft, coordinating and/or communicating with air traffic control, and the like. Although the subject matter is described herein in an aviation context, it should be understood that the subject matter may be similarly utilized in other applications involving a predefined route for travel (e.g., a travel plan or travel route) or with another vehicle (e.g., automobiles, marine vessels, trains), and the subject matter described herein is not intended to be limited to an aviation environment.

FIG. 1 depicts an exemplary embodiment of a display system 100, which may be located onboard a vehicle such as an aircraft 118. In an exemplary embodiment, the display system 100 includes, without limitation, a display device 102, a navigation system 104, a communications system 106, a flight management system 108 (FMS), a processing architecture 112, and a graphics module 114. The display system 100 may further include a user interface 110 for enabling interactivity with the display system 100 and a database 116 suitably configured to support operation of the display system 100, as described in greater detail below. It should be understood that FIG. 1 is a simplified representation of a display system 100 for purposes of explanation and ease of description, and FIG. 1 is not intended to limit the application or scope of the subject matter in any way. In practice, the display system 100 and/or aircraft 118 will include numerous other devices and components for providing additional functions and features, as will be appreciated in the art. For example, the display system 100 and/or aircraft 118 may include one or more avionics systems (e.g., a weather system, an air traffic management system, a radar system, a traffic avoidance system) coupled to the flight management system 108 and/or the processing architecture 112 for obtaining and/or providing real-time flight-related information that may be displayed on the display device 102.

In an exemplary embodiment, the display device 102 is coupled to the graphics module 114. The graphics module 114 is coupled to the processing architecture 112, and the processing architecture 112 and the graphics module 114 are cooperatively configured to display, render, or otherwise convey one or more graphical representations or images associated with operation of the aircraft 118 on the display device 102, as described in greater detail below. The processing architecture 112 is coupled to the navigation system 104 for obtaining real-time navigational data and/or information regarding operation of the aircraft 118 to support operation of the display system 100. In an exemplary embodiment, the communications system 106 is coupled to the processing architecture 112 and configured to support communications to and/or from the aircraft 118, as will be appreciated in the art. The processing architecture 112 is also coupled to the flight management system 108, which in turn, may also be coupled to the navigation system 104 and the communications system 106 for providing real-time data and/or information regarding operation of the aircraft 118 to the processing architecture 112 to support operation of the aircraft 118, as will be appreciated in the art. In an exemplary embodiment, the user interface 110 is coupled to the processing architecture 112, and the user interface 110 and the processing architecture 112 are cooperatively configured to allow a user to interact with the display device 102 and other elements of display system 100, as described in greater detail below.

In an exemplary embodiment, the display device 102 is realized as an electronic display configured to graphically display flight information or other data associated with operation of the aircraft 118 under control of the graphics module 114. In an exemplary embodiment, the display device 102 is located within a cockpit of the aircraft 118. It will be appreciated that although FIG. 1 shows a single display device 102, in practice, additional display devices may be present onboard the aircraft 118. In an exemplary embodiment, the user interface 110 is also located within the cockpit of the aircraft 118 and adapted to allow a user (e.g., pilot, co-pilot, or crew member) to interact with the display system 100 and enables a user to indicate, select, or otherwise manipulate content displayed on the display device 102, as described in greater detail below. In various embodiments, the user interface 110 may be realized as a keypad, touchpad, keyboard, mouse, touchscreen, joystick, knob, microphone, or another suitable device adapted to receive input from a user. It should be appreciated that although FIG. 1 shows the display device 102 and the user interface 110 as being located within the aircraft 118, in practice, the display device 102 and/or user interface 110 may be located outside the aircraft 118 (e.g., on the ground as part of an air traffic control center or another command center) and communicatively coupled to the remaining elements of the display system 100 (e.g., via a data link).

In an exemplary embodiment, the navigation system 104 is configured to obtain one or more navigational parameters associated with operation of the aircraft 118. The navigation system 104 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 104, as will be appreciated in the art. In an exemplary embodiment, the navigation system 104 is capable of obtaining and/or determining the instantaneous position of the aircraft 118, that is, the current location of the aircraft 118 (e.g., the latitude and longitude) and the altitude or above ground level for the aircraft 118. In some embodiments, the navigation system 104 may also obtain and/or determine the heading of the aircraft 118 (i.e., the direction the aircraft is traveling in relative to some reference). In an exemplary embodiment, the communications system 106 is suitably configured to support communications between the aircraft 118 and another aircraft or ground location (e.g., air traffic control). In this regard, the communications system 106 may be realized using a radio communication system or another suitable data link system.

In an exemplary embodiment, the flight management system 108 (or, alternatively, a flight management computer) is located onboard the aircraft 118. Although FIG. 1 is a simplified representation of display system 100, in practice, the flight management system 108 may be coupled to one or more additional modules or components as necessary to support navigation, flight planning, and other aircraft control functions in a conventional manner.

In an exemplary embodiment, the flight management system 108 maintains information pertaining to a current flight plan (or alternatively, a current route or travel plan). In this regard, depending on the embodiment, the current flight plan may comprise either a selected or otherwise designated flight plan for subsequent execution, a flight plan selected for review on the display device 102, and/or a flight plan currently being executed by the aircraft 118. In this regard, as used herein, a flight plan should be understood as a sequence of navigational reference points that define a flight path or route for the aircraft 118. In this regard, depending on the particular flight plan and type of air navigation, the navigational reference points may comprise navigational aids, such as VHF omni-directional ranges (VORs), distance measuring equipment (DMEs), tactical air navigation aids (TACANs), and combinations thereof (e.g., VORTACs), landing and/or departure locations (e.g., airports, airstrips, runways, landing strips, heliports, helipads, and the like), points of interest or other features on the ground, as well as position fixes (e.g., initial approach fixes (IAFs) and/or final approach fixes (FAFs)) and other navigational reference points used in area navigation (RNAV). For example, a flight plan may include an initial or beginning reference point (e.g., a departure or takeoff location), a final navigational reference point (e.g., an arrival or landing location), and one or more intermediate navigational reference points (e.g., waypoints, positional fixes, and the like) that define the desired path or route for the aircraft 118 from the initial navigational reference point to the final navigational reference point. In this regard, the intermediate navigational reference points may define one or more airways for the aircraft 118 en route to the final navigational reference point.

As described in greater detail below, the along track distance (or length) of the flight plan comprises the sum of all of the straight line ground distances between adjacent navigational reference points of the flight plan, that is, the total ground distance corresponding to the route defined by the plurality of navigational reference points comprising the flight plan. For example, if the flight plan comprises three navigational reference points, the along track distance (or length) of the flight plan is equal to the sum of the straight line ground distance between a location corresponding to the first navigational reference point and a location corresponding to the second navigational reference point and the straight line ground distance between the location corresponding to the second navigational reference point and a location corresponding to the third navigational reference point. In this regard, as used herein, along track distance should be understood as referring to the distance between two points as measured along the route or path defined by the navigational reference points comprising the flight plan.

In some embodiments, the flight management system 108 may include a database that maintains a plurality of predefined flight plans, wherein a predefined flight plan from the database may be selected by a user via user interface 110 for use as the current flight plan. In another embodiment, the current flight plan may be uplinked via the communications system 106. Alternatively, the user may utilize the user interface 110 to manually enter or indicate the desired endpoints (e.g., the initial and final navigational reference points) for the current flight plan. Depending on the embodiment, the user may manually enter the intermediate navigational reference points (e.g., via user interface 110), or alternatively, the intermediate navigational reference points may be automatically generated by the flight management system 108 based on the endpoints (e.g., the initial and final navigational reference points) of the flight plan, as will be appreciated in the art. As described in greater detail below, in an exemplary embodiment, the processing architecture 112 and/or graphics module 114 are configured to display and/or render information pertaining to the currently selected flight plan on the display device 102 to allow a user (e.g., via user interface 110) to review various aspects (e.g., estimated fuel requirements, estimated flight time, rates of ascent/descent, flight levels and/or altitudes, and the like) of the currently selected flight plan.

The processing architecture 112 generally represents the hardware, software, and/or firmware components configured to facilitate the display and/or rendering of a navigational map on the display device 102 and perform additional tasks and/or functions described in greater detail below. Depending on the embodiment, the processing architecture 112 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The processing architecture 112 may also be implemented as a combination of computing devices, e.g., a combination of a digital signal processor and a microprocessor, a plurality of microprocessors, one or more microprocessors in conjunction with a digital signal processor core, or any other such configuration. In practice, the processing architecture 112 includes processing logic that may be configured to carry out the functions, techniques, and processing tasks associated with the operation of the display system 100, as described in greater detail below. Furthermore, the steps of a method or algorithm described in connection with the embodiments disclosed herein may be embodied directly in hardware, in firmware, in a software module executed by the processing architecture 112, or in any practical combination thereof.

The graphics module 114 generally represents the hardware, software, and/or firmware components configured to control the display and/or rendering of a navigational map on the display device 102 and perform additional tasks and/or functions described in greater detail below. In an exemplary embodiment, the graphics module 114 accesses one or more databases 116 suitably configured to support operations of the graphics module 114, as described below. In this regard, the database 116 may comprise a terrain database, an obstacle database, a navigational database, a geopolitical database, a terminal airspace database, a special use airspace database, or other information for rendering and/or displaying content on the display device 102, as described below. It will be appreciated that although FIG. 1 shows a single database 116 for purposes of explanation and ease of description, in practice, numerous databases will likely be present in a practical embodiment of the display system 100.

Figure 2:
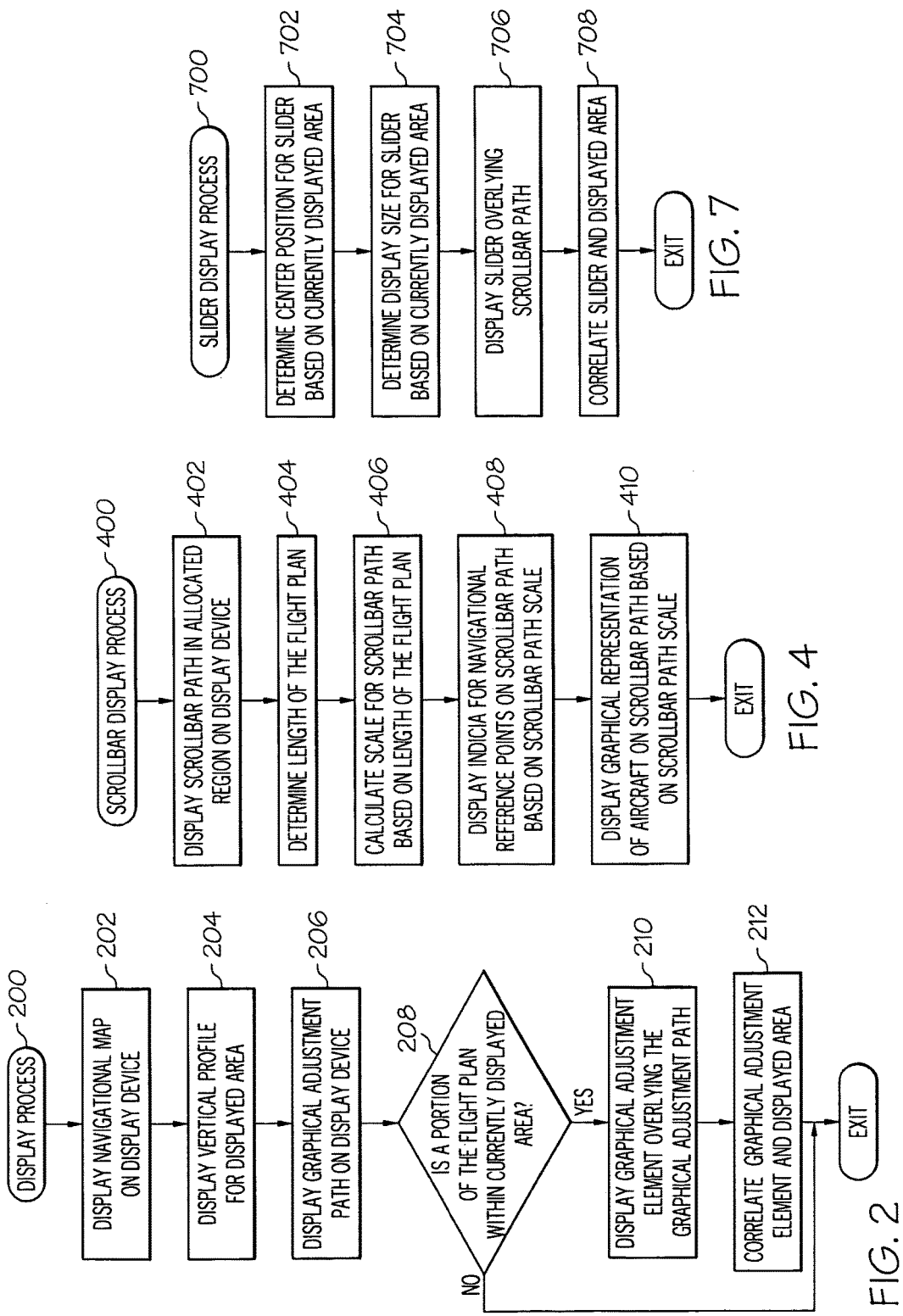
FIG. 2 is a flow diagram of an exemplary display process suitable for use with the display system of FIG. 1 in accordance with one embodiment.

Referring now to FIG. 2, in an exemplary embodiment, a display system 100 may be configured to perform a display process 200 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the display device 102, the flight management system 108, the user interface 110, the processing architecture 112, the graphics module 114 and/or the database 116. It should be appreciated that any number of additional or alternative tasks may be included, and may be incorporated into a more comprehensive procedure or process having additional functionality not described in detail herein.

Figure 3:
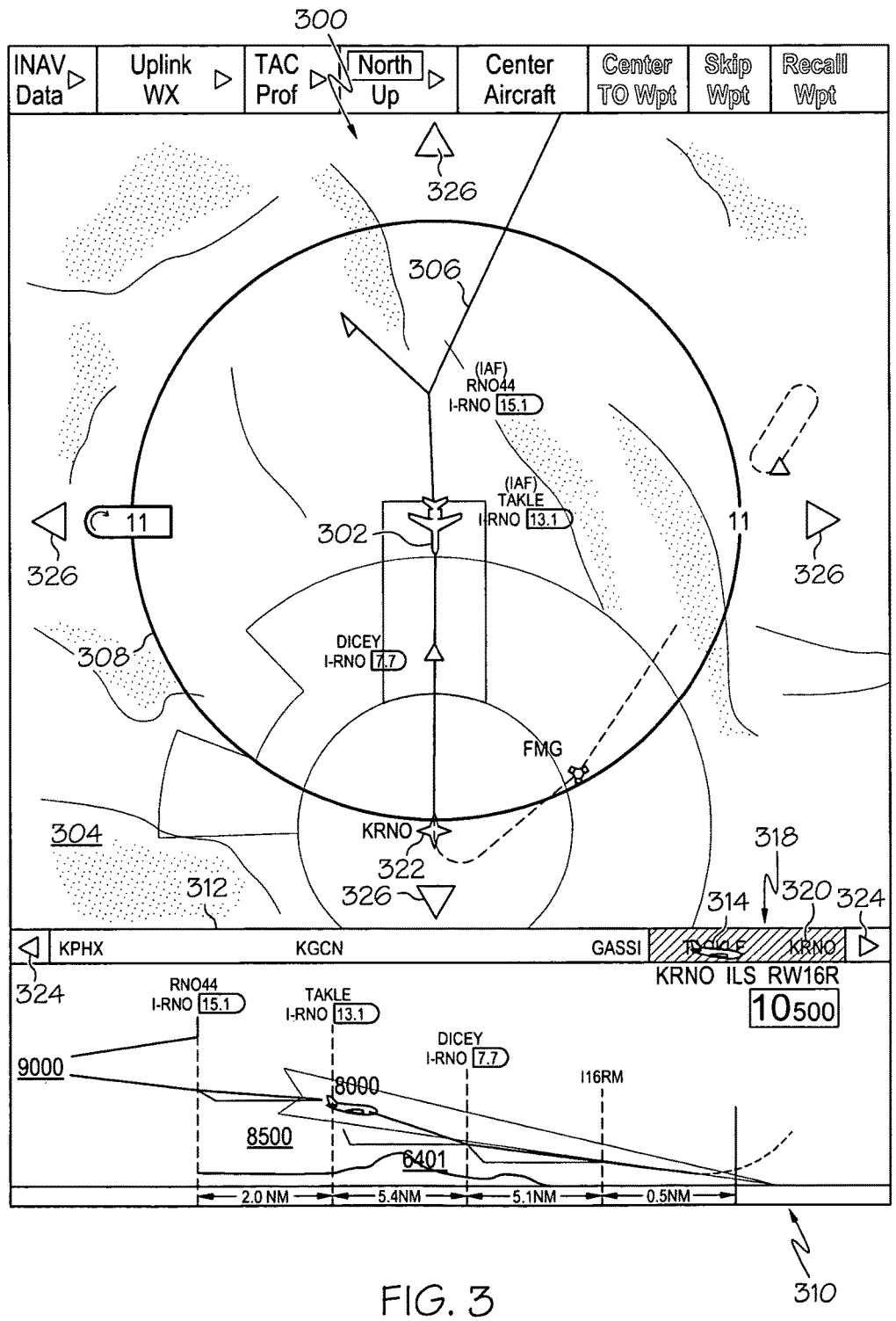
FIG. 3 is a schematic view of an exemplary navigational map suitable for use with the information display process of FIG. 2 in accordance with one embodiment.

Referring again to FIG. 2, and with continued reference to FIG. 1, a display process 200 may be performed to enable a user, such as a pilot or crew member, to quickly and easily adjust (or scroll) the displayed area (or field of view) of the navigational map along the flight path or route defined by a flight plan (or travel plan). In an exemplary embodiment, the display process 200 initializes by displaying a navigational map pertaining to operation of a vehicle, such as an aircraft, in a viewing area on a display device associated with the vehicle (task 202). For example, referring now to FIG. 3, and with continued reference to FIG. 1 and FIG. 2, the display process 200 may display and/or render a navigational map 300 associated with the current (or instantaneous) location of an aircraft on a display device in the aircraft. The aircraft 302 and/or terrain 304 are positioned and/or rendered within the navigational map 300 with respect to the center location in a manner that accurately reflects the real-world positioning of the aircraft 302 and/or terrain 304 relative to the center location such that the navigational map 300 corresponds to a top-down view of the aircraft 118 (e.g., from a higher altitude than the aircraft 118 is currently flying). In this regard, the graphics module 114 may be configured to control the rendering of the navigational map 300, which may be graphically displayed on the display device 102. The display process 200 may also be configured to render a graphical representation of the aircraft 302 on the map 300, which may be overlaid or rendered on top of a background 304. Although FIG. 3 depicts a top view (e.g., from above the aircraft 302) of the navigational map 300, in practice, alternative embodiments may utilize various perspective views, such as side views, three-dimensional views (e.g., a three-dimensional synthetic vision display), angular or skewed views, and the like.

In an exemplary embodiment, the background 304 comprises a graphical representation of the terrain, topology, airspace designations and/or restrictions, or other suitable items or points of interest corresponding to the currently displayed area of the navigational map 300, which may be maintained in a terrain database, a navigational database, a geopolitical database, or another suitable database. In addition, depending on the embodiment, the display process 200 may render other real-time flight related information that is within the geographic area corresponding to the currently displayed area of the navigational map 300 or within a particular proximity of the aircraft, such as, for example, weather conditions, radar data, neighboring air traffic, and the like, as will be appreciated in the art. In an exemplary embodiment, the display process 200 renders and/or displays a graphical representation of a portion of the flight plan 306 overlying the background 304 such that the portion of the flight plan 306 within the geographic area corresponding to the currently displayed area of the navigational map 300 is presented on the display device. As described in greater detail below, the displayed area of the navigational map corresponds to the geographic area that is currently displayed in the navigational map 300, that is, the field of view about the center location of the navigational map 300. As used herein, the center location of the navigational map 300 comprises a reference location for the middle or geometric center of the navigational map 300 which corresponds to a geographic location.

In an exemplary embodiment, the map 300 is associated with the movement of the aircraft, and the background 304 refreshes or updates as the aircraft travels, such that the graphical representation of the aircraft 302 is positioned over the terrain background 304 in a manner that accurately reflects the current (e.g., instantaneous or substantially real-time) real-world positioning of the aircraft 118 relative to the earth. As shown in FIG. 3, in accordance with one or more embodiments, the map 300 may be initially centered on the aircraft 302 such that the center location of the navigational map 300 corresponds to the current location of the aircraft 302. In this regard, the center location of the navigational map 300 may be updated or refreshed such that it corresponds to the instantaneous location of the aircraft 302 as the aircraft travels, as will be appreciated in the art. In alternative embodiments, the center location of the navigational map 300 may correspond to a geographic location that is independent of the current location of the aircraft.

In an exemplary embodiment, the navigational map 300 is displayed with initial display settings. The display settings comprise one or more characteristics that control the manner in which the aircraft 302 and/or terrain 304 initially appear on the display device, such as, for example, an initial orientation, center location, and range setting. In the illustrated embodiment shown in FIG. 3, the orientation of the navigational map 300 is north-up (i.e., moving upward on the map 300 corresponds to traveling northward). However, in other embodiments, the orientation of the navigational map 300 may be track-up or heading-up (i.e., aligned such that the aircraft 302 is always traveling in an upward direction and the background 304 adjusted accordingly) or with another direction (e.g., east-up), and the subject matter described herein is not limited to any particular orientation of the navigational map 300. As set forth above, the center location of the navigational map 300 comprises a reference location for the middle or geometric center of the navigational map 300 which corresponds to a geographic location on the ground. The aircraft 302 and/or terrain 304 are positioned and/or rendered within the navigational map 300 with respect to the center location in a manner that accurately reflects the real-world positioning of the aircraft 302 and/or terrain 304 relative to the center location such that the navigational map 300 corresponds to a top-down view of the aircraft 118 (e.g., from a higher altitude than the aircraft 118 is currently flying).

The range setting for the navigational map 300 corresponds to the field of view for the currently displayed area of the navigational map 300, that is, the amount of geographic area (e.g., terrain 304) displayed or otherwise represented in the navigational map 300. In this regard, the range setting for the navigational map 300 is inversely related to the scale of the navigational map 300, that is, the ratio of a single unit of distance on the map 300 to a corresponding distance on the ground. As such, a higher range setting corresponds to a lower scale (or a larger field of view) and a larger displayed area for the navigational map 300 while a lower range setting corresponds to a higher scale (or a smaller field of view) and a smaller displayed area for the navigational map 300. In this regard, increasing the range setting will result in a greater amount of the flight plan 306 being displayed in the navigational map 300 while decreasing the range setting will reduce the amount of the flight plan 306 that is displayed in the navigational map 300. In an exemplary embodiment, the display process 200 indicates the range setting for the navigational map 300 by displaying and/or rendering a range ring 308 on the navigational map 300. The range ring 308 comprises a circle that is always displayed with a fixed dimension and/or size on the navigational map 300 and indicates the range setting for the navigational map 300. In accordance with one embodiment, the range setting is equal to the real-world distance that corresponds to (or is equivalent to) the radius of the range ring 308 based on the scale of the navigational map 300. As shown in FIG. 3, the range ring 308 indicates that the radius of the circle comprising the range ring 308 corresponds to a distance of eleven nautical miles.

In an exemplary embodiment, the display process 200 continues by displaying a vertical profile on the display device (task 204). In an exemplary embodiment, the display process 200 displays the vertical profile corresponding to a portion of the flight plan that is within currently displayed area of the navigational map. For example, as shown in FIG. 3, the display process 200 may display the vertical profile 310 corresponding to the portion of the flight plan 306 displayed within the currently displayed area of the navigational map 300. In accordance with one embodiment, the display process 200 correlates the vertical profile with the portion of the flight plan within the currently displayed area, such that when the currently displayed area is adjusted to show a different portion of the flight plan, the display process 200 updates the vertical profile accordingly, as described in greater detail below.

In an exemplary embodiment, the display process 200 continues by displaying a graphical adjustment path (or track) on the display device the navigational map (task 206). The graphical adjustment path corresponds to or otherwise defines a track or path for a graphical adjustment element, as described in greater detail below. In an exemplary embodiment, the graphical adjustment path is realized as a scrollbar path 312 that defines a track for a graphical adjustment element 318 as shown in FIG. 3. As described in greater detail below in the context of the scrollbar display process 400 of FIG. 4, the length (or another suitable dimension) of the graphical adjustment path corresponds to the total along track distance between two navigational reference points of the flight plan (or travel plan). In this regard, in an exemplary embodiment, the length of a flight plan scrollbar path corresponds to the along track distance from the initial navigational reference point to the final navigational reference point of the flight plan (or alternatively, the along track distance or length of the flight plan). As shown in FIG. 2, the flight plan scrollbar path 312 may be rendered and/or displayed on the display device proximate to or overlying the navigational map 300. In an exemplary embodiment, the flight plan scrollbar path 312 is oriented horizontally across the viewing area on the display device, and positioned proximate a border of the navigational map 300. For example, as shown in FIG. 3, the flight plan scrollbar path 312 is oriented horizontally across the entire width of the viewing area of the display device that the navigational map 300 is displayed on, and the flight plan scrollbar path 312 is positioned proximate the lower edge of the navigational map 300. As described in greater detail below, the display process 200 renders and/or displays a graphical representation of the aircraft 314 overlying the flight plan scrollbar path 312 and positioned with respect to the flight plan scrollbar path 312 such that the aircraft 314 position relative to the flight plan scrollbar path 312 corresponds to the along track distance from the initial navigational reference point of the flight plan to the current location of the aircraft 302.

In an exemplary embodiment, the display process 200 continues by determining whether a portion of the flight plan is displayed within the currently displayed area of the navigational map (task 208). In an exemplary embodiment, when a portion of the route defined by the flight plan is displayed within the currently displayed area, the display process 200 continues by displaying and/or rendering a graphical adjustment element, such as a slider or another suitable element, overlying the graphical adjustment path for enabling a user to adjust (or scroll) the displayed area of the navigational map along the route defined by the flight plan (task 210). In an exemplary embodiment, the graphical adjustment element is realized as a slider 318 overlying the flight plan scrollbar path 312, as shown in FIG. 3. As described in greater detail below in the context of the slider display process 700 of FIG. 7, the graphical adjustment element is rendered and/or displayed overlying the graphical adjustment path at a position that corresponds to the along track distance between the currently displayed area and the initial navigational reference point of the flight plan. Thus, the position of the graphical adjustment element with respect to the graphical adjustment path corresponds to the location of the currently displayed area relative to the initial navigational reference point of the flight plan. For example, as shown in FIG. 3, the slider 318 is positioned toward the end of the flight plan scrollbar path 312, indicating that the currently displayed area of the navigational map 300 is near the final navigational reference point (KRNO) of the flight plan. In the illustrated embodiment, the slider 318 is positioned near the right edge of the flight plan scrollbar path 312 and the slider 318 overlaps an indicator 320 on the flight plan scrollbar path 312 that corresponds to the final navigational reference point (KRNO) of the flight plan, thereby indicating that the final navigational reference point 322 (KRNO) is within the currently displayed area of the navigational map 300, i.e., the final navigational reference point 322 is rendered and/or displayed on the navigational map 300.

As described in greater detail below in the context of slider display process 700 of FIG. 7, in an exemplary embodiment, the display process 200 correlates the graphical adjustment element and the displayed area of the navigational map (task 212). In this regard, any change or adjustment to the displayed area of the navigational map 300 produces a corresponding change in the center position of the graphical adjustment element 318 with respect to the graphical adjustment path 312, and any change or adjustment of the center position of the graphical adjustment element 318 with respect to the graphical adjustment path 312 produces a corresponding change in the currently displayed area of the navigational map 300 and/or the vertical profile 310. For example, a user may manipulate the user interface 110 to manipulate and/or slide the slider 318, select (or click on) a portion of the flight plan scrollbar path 312 unoccupied by the slider 318, or otherwise increment the slider 318 (e.g., by using graphical control elements such as arrow buttons 324) to adjust the slider position with respect to the flight plan scrollbar path 312. In response, the center location of the currently displayed area of the navigational map 300 is updated and/or adjusted in a manner that corresponds to the change in the slider position such that the currently displayed area of the navigational map 300 reflects the updated slider position. In addition, in accordance with one or more embodiments, the vertical profile is updated and/or adjusted to reflect a portion of the flight plan corresponding to the updated slider position, as described in greater detail below. In this manner, the slider 318 and scrollbar path 312 collectively function as a scrollbar for scrolling or otherwise adjusting the displayed area of the navigational map along the route defined by the flight plan.

Additionally, in an exemplary embodiment, the user may adjust the center location of the navigational map 300 (e.g., by moving and/or repositioning the center location of the currently displayed area in a cardinal direction using graphical control elements 326), and in response, the center position of the slider 318 is updated and/or adjusted such that the position of the slider 318 with respect to the flight plan scrollbar path 312 corresponds to the updated center location for the displayed area of the navigational map 300. In addition, in response to a change or adjustment of the range setting for the navigational map 300, the size and/or width of the slider 318 is adjusted and/or updated in a manner that reflects the field of view of the currently displayed area, as described in greater detail below.

Referring now to FIG. 4, in an exemplary embodiment, a display system 100 may be configured to perform a scrollbar display process 400 and additional tasks, functions, and operations described below. The various tasks may be performed by software, hardware, firmware, or any combination thereof. For illustrative purposes, the following description may refer to elements mentioned above in connection with FIGS. 1-3. In practice, the tasks, functions, and operations may be performed by different elements of the described system, such as the display device 102, the flight management system 108, the user interface 110, the processing architecture 112, the graphics module 114 and/or the database 116. It should be appreciated that any number of additional or alternative tasks may be included, and may be incorporated into a more comprehensive procedure or process having additional functionality not described in detail herein.

Figure 5:
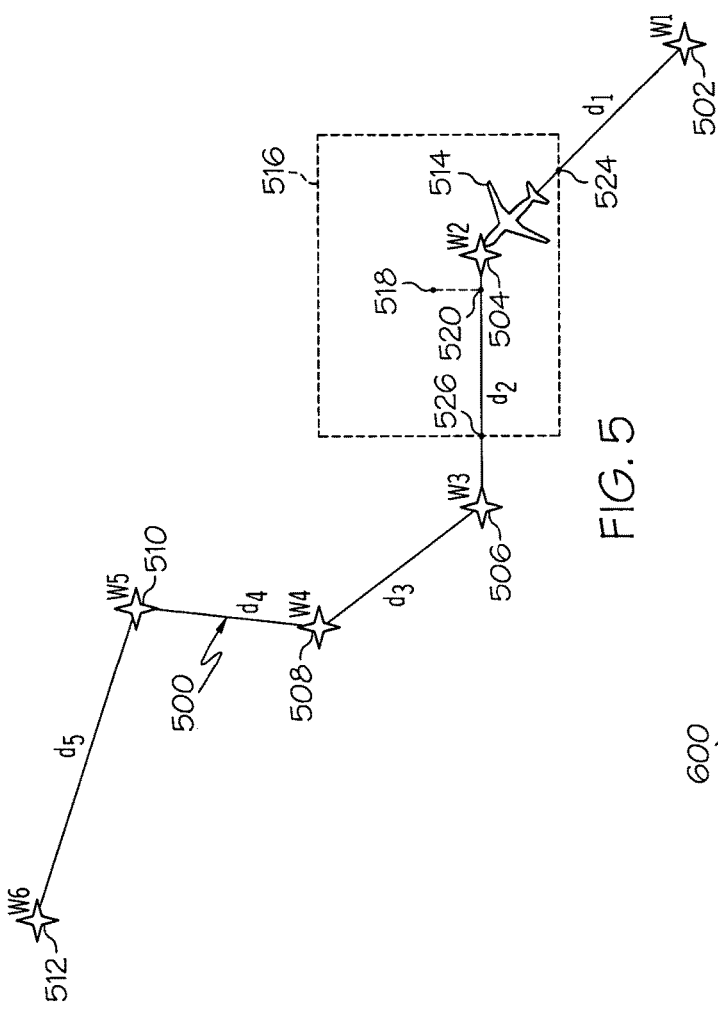
FIG. 5 depicts a displayed area of a navigational map with respect to a flight plan suitable for use with the display process of FIG. 2 in accordance with one embodiment.

Referring again to FIG. 4, and with continued reference to FIGS. 1-3, a scrollbar display process 400 initializes by displaying and/or rendering the graphical adjustment path in an allocated region within the viewing area of the display device (task 402). For example, in the exemplary embodiment shown in FIG. 3, when the scrollbar path 312 is oriented horizontally, the scrollbar path 312 is allocated a region adjacent to a border (or edge) of the navigational map 300 (e.g., adjacent to the bottom and/or top of the navigational map 300) having a horizontal dimension that corresponds to the width of the viewing area of the display device. In an exemplary embodiment, the scrollbar display process 400 continues by determining the distance (or length) of the flight plan (task 404). In this regard, in an exemplary embodiment, the scrollbar display process 400 determines and/or calculates the total along track distance from the initial navigational reference point to the final navigational reference point of the flight plan, that is, the straight line ground distance when sequentially traversing the ground locations that correspond to the individual navigational reference points of the route defined by the flight plan. For example, FIG. 5 depicts a flight plan 500 comprising a six navigational reference points 502, 504, 506, 508, 510, 512, wherein the distance (or length) of the flight plan 500 ($d_f$) is equal to the sum of the straight line distances between consecutive reference points, i.e., $d_f = d_1 + d_2 + d_3 + d_4 + d_5$.

Referring again to FIG. 4, in an exemplary embodiment, the scrollbar display process 400 continues by calculating or otherwise determining the scale of the graphical adjustment path (task 406). The scale of the graphical adjustment path corresponds to the relationship of the length of the graphical adjustment path on the display device to the along track distance (or length) of the flight plan. In an exemplary embodiment, for a horizontal scrollbar path, the scale is equal to the length of the scrollbar path in pixels (e.g., the number of pixels horizontally occupied by the flight plan scrollbar path) to the distance (or length) of the flight plan (e.g., the total along track distance for the flight plan). For example, if the flight plan scrollbar path is two hundred pixels long and the flight plan distance is four hundred nautical miles, the scale of the scrollbar path is equal to ½ pixels per nautical mile (or alternatively, 2 nautical miles per pixel).

In an exemplary embodiment, the scrollbar display process 400 continues by displaying and/or rendering indicia for the navigational reference points of the flight plan overlying the graphical adjustment path based on the scale of the graphical adjustment path (task 408). For example, referring to FIG. 5 and FIG. 6 with continued reference to FIGS. 1-4, the scrollbar display process 400 may render and/or display graphical indicators or markers 602, 604, 606, 608, 610, 612 that correspond to the navigational reference points 502, 504, 506, 508, 510, 512 of the flight plan 500 overlying the flight plan scrollbar path 600. In addition, the scrollbar display process 400 may also render and/or display text or other information associated with the navigational reference points (e.g., the names of the navigational reference points) overlying the flight plan scrollbar path 600 as shown.

Figure 6:
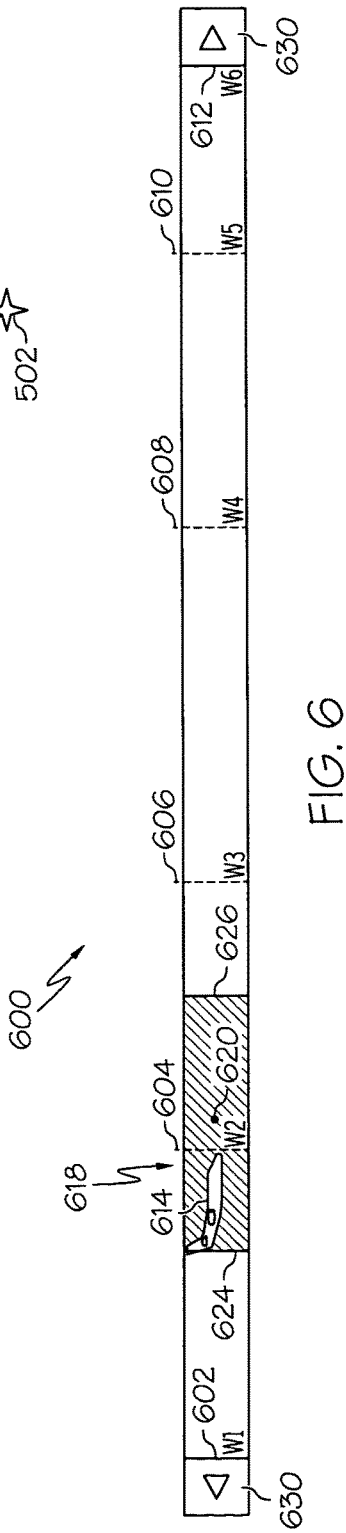
FIG. 6 depicts a scrollbar suitable for use with the display process of FIG. 2 that corresponds to the displayed area with respect to the flight plan of FIG. 5 in accordance with one embodiment.
Figure 9:
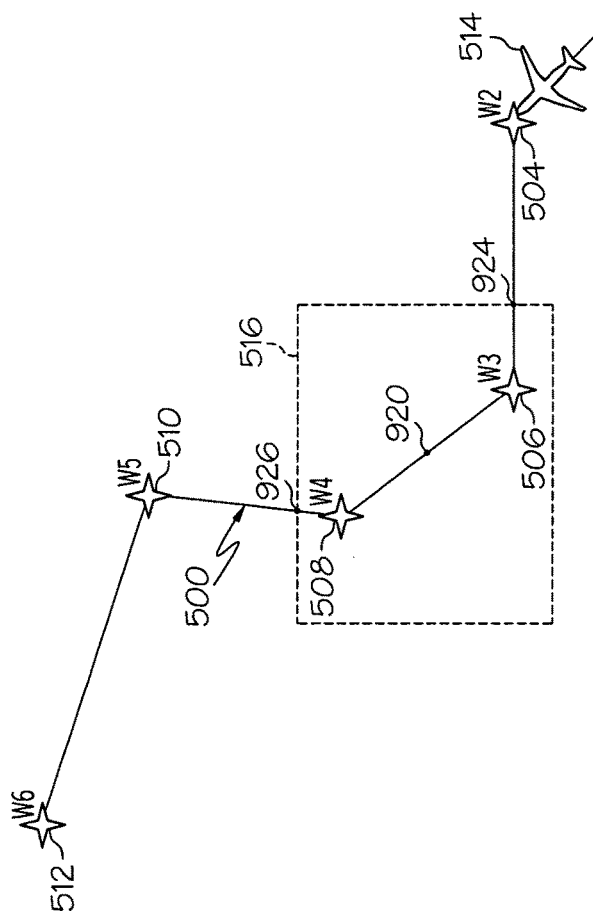
FIG. 9 depicts an updated display area with respect to the flight plan suitable for use with the display process of FIG. 2 in response to the adjustment of the slider position of FIG. 8 in accordance with one embodiment.

In the illustrated embodiment of FIG. 6, the indicia (e.g., text and/or marker 602, 604, 606, 608, 610, 612) for each navigational reference point of the flight plan 500 is positioned overlying the scrollbar path 600 in a manner that reflects the spatial relationship of the respective navigational reference point to other navigational reference points of the flight plan, or in other words, the indicia are positioned based on the along track distance between the other navigational reference points of the flight plan 500 and the scale of the scrollbar path 600. For example, as shown in FIG. 6, a scrollbar path 600 may be configured such that going from left to right along the scrollbar path 600 corresponds to progressing through the flight plan 500 from the initial navigational reference point 502 to the final navigational reference point 512. In this regard, the indicia 602 for the initial navigational reference point 502 of the flight plan 500 is displayed and/or rendered along the left edge of the scrollbar path 600. The indicia 604 for the second navigational reference point 504 is positioned overlying the scrollbar path 600 in a manner that reflects the along track distance between the initial navigational reference point 502 and the second navigational reference point 504. In this regard, the scrollbar display process 400 calculates the number of pixels between the indicia 604 for the second navigational reference point 504 and the indicia 602 for the initial navigational reference point 502 (the left edge of the scrollbar path 600) by multiplying the along track distance between the second navigational reference point 504 and the initial navigational reference point 502 by the scale of the scrollbar path 600. In this regard, the number of pixels between the indicia 602 for the initial navigational reference point 502 and the indicia 604 for the second navigational reference point 504 is equal to $$d_1 \times \frac{n}{d_f},$$

where n is the number of horizontal pixels comprising the scrollbar path 600. In a similar manner, the indicia 606 for the third navigational reference point 506 is positioned overlying the scrollbar path 600 in a manner that reflects the along track distance between the third navigational reference point 506 and the preceding navigational reference points 502, 504. The number of pixels between the indicia 606 for the third navigational reference point 506 and the indicia 602 for the initial navigational reference point 502 is equal to the scale of the scrollbar path 600 multiplied by the along track distance between the third navigational reference point 506 and the initial navigational reference point 502, such that the indicia 606 for the third navigational reference point 506 are $$\left((d_1 + d_2) \times \frac{n}{d_f}\right)$$

pixels from the indicia 602 for the initial navigational reference point 502 and $$d_2 \times \frac{n}{d_f}$$

pixels from the indicia 604 for the second navigational reference point 504. The indicia 608, 610, 612 for the remaining navigational reference points 508, 510, 512 are positioned in a similar manner, such that the positioning of the indicia for the respective navigational reference point to the scrollbar path 600 accurately reflects the spatial relationship of the respective navigational reference point to the along track distance of the flight plan 500. In this regard, the indicia 612 for the final navigational reference point 512 is located along the right edge of the scrollbar path 600 or n pixels from the indicia 602 for the initial navigational reference point 502.

In an exemplary embodiment, the scrollbar display process 400 continues by displaying and/or rendering a graphical representation of the aircraft overlying the flight plan scrollbar path based on the current location of the aircraft and the scale of the graphical adjustment path (task 410). In this regard, the positioning of the graphical representation of the aircraft with respect to the graphical adjustment path corresponds to the along track distance from the initial navigational reference point to the current location of the aircraft multiplied by the scale of the graphical adjustment path. In this manner, the graphical representation of the aircraft overlying the graphical adjustment path reflects the real-world progress of the aircraft with respect to the flight plan. For example, as shown in FIGS. 5 and 6, the current location of the aircraft 514 is approaching the second navigational reference point 504 of the flight plan 500 and the graphical representation of the aircraft 614 is positioned overlying the scrollbar path 600 such that the graphical representation of the aircraft 614 is approaching the indicia (e.g., W2 and marker 602) for the second navigational reference point 504. In this regard, the aircraft position 614 with respect to the flight plan scrollbar path 600 corresponds to the along track distance from the initial navigational reference point 502 to the current location of the aircraft 514 multiplied by the scale of the scrollbar path 600.

Referring now to FIG. 7, in an exemplary embodiment, a display system 100 may be configured to perform a slider display process 700 and additional tasks, functions, and operations described below. The various tasks may be performed by software, hardware, firmware, or any combination thereof. For illustrative purposes, the following description may refer to elements mentioned above in connection with FIGS. 1-6. In practice, the tasks, functions, and operations may be performed by different elements of the described system, such as the display device 102, the flight management system 108, the user interface 110, the processing architecture 112, the graphics module 114 and/or the database 116. It should be appreciated that any number of additional or alternative tasks may be included, and may be incorporated into a more comprehensive procedure or process having additional functionality not described in detail herein.

Referring again to FIG. 7, and with continued reference to FIGS. 1-6, a slider display process 700 initializes by determining a center position for the graphical adjustment element, such as a slider, based on the currently displayed area of the navigational map (task 702). In this regard, the center position of the graphical adjustment element corresponds to the portion of the flight plan currently displayed in the navigational map such that the center position of the graphical adjustment element with respect to graphical adjustment path reflects the portion of the flight plan displayed within the navigational map. In accordance with one embodiment, the center position of the graphical adjustment element corresponds to a point within the flight plan (or a point along the route defined by the flight plan) that is nearest the center location of the currently displayed area of the navigational map. For example, referring to FIG. 5, when the center location 518 of the currently displayed area 516 is not along the flight plan 500, the slider display process 700 calculates and/or determines a point 520 within the flight plan 500 that is nearest to the center location 518 of the currently displayed area 516 by computing or otherwise determining a line through the center location 518 that perpendicularly intersects the flight plan 500 and identifying the intersection point 520 as the point nearest the center location 518 of the currently displayed area 516. The slider display process 700 calculates and/or determines the along track distance from the initial navigational reference point of the flight plan to the point within the flight plan corresponding to the center location of the currently displayed area, and multiplying the distance by the scale of the flight plan scrollbar path to obtain the center position in pixels. For example, referring to FIG. 5 and FIG. 6, the slider display process 700 may calculate and/or determine the along track distance from the initial navigational reference point 502 to the intersection point 520 (e.g., by adding the straight line distance between navigational reference points 502, 504 and the straight line distance between points 504, 520) and multiply the result by the scale of the flight plan scrollbar path 600 to determine the center position 620 (alternatively, the slider position) for the slider 618.

In an exemplary embodiment, the slider display process 700 continues by determining and/or calculating a display size (or display dimensions) for the graphical adjustment element based on the size of the currently displayed area of the navigational map and the scale of the graphical adjustment path (task 704). In this manner, the size and/or dimensions of the graphical adjustment element correspond to the range setting and/or field of view for the navigational map such that the size and/or width of the graphical adjustment element reflects the field of view of the currently displayed area. In this regard, a larger range setting results in a larger display size while a smaller range setting results in a smaller display size, as described in greater detail below. In accordance with one embodiment, the display size of the graphical adjustment element corresponds to the along track distance for the portion of the flight plan that lies within the currently displayed area (i.e., the currently displayed portion of the flight plan in the navigational map) such that the size of the graphical adjustment element with respect to the graphical adjustment path reflects the ratio of the along track distance for the portion of the flight plan that lies within the currently displayed area to the total along track distance for the flight plan. For example, referring again to FIG. 5, the slider display process 700 may calculate and/or determine the display size for the slider by determining and/or calculating the along track distance for the portion of the flight plan 500 within the currently displayed area 516 and then multiplying the along track distance for the currently displayed portion of the flight plan by the scale of the scrollbar path 600 to obtain the number of pixels (or pixel width) for the slider. In this manner, the display size of the slider with respect to the flight plan scrollbar path corresponds to the along track distance between points 524, 526 (e.g., the sum of the straight line distance between points 504, 524 and the straight line distance between points 504, 526) of the flight plan 500 that are at the edges of the currently displayed area 516.

In an exemplary embodiment, the slider display process 700 continues by displaying and/or rendering the graphical adjustment element overlying the graphical adjustment path with the determined center position and display size (task 706). For example, referring to FIG. 5 and FIG. 6, the slider 618 is displayed and/or rendered at a center position 620 that corresponds to the center location 518 of the currently displayed area 516 and a width that corresponds to the portion of the flight plan 500 within the field of view of the currently displayed area 516. In this regard, the number of pixels between the center position 620 of the slider 618 and the marker 604 for the second navigational reference point 504 corresponds to the along track distance between the second navigational reference point 504 and the intersection point 520 multiplied by the scale of the scrollbar path 600. Similarly, the number of pixels between the leading edge 626 of the slider 618 and the trailing edge 624 corresponds to the along track distance between the point 526 of the flight plan 500 at the leading edge of the currently displayed area 516 and the point 524 of the flight plan 500 at the trailing edge of the currently displayed area 516 multiplied by the scale of the scrollbar path 600.

In an exemplary embodiment, the slider display process 700 continues by correlating the graphical adjustment element and the navigational map (task 708). In this regard, the slider display process 700 automatically updates the either the navigational map and/or the graphical adjustment element such that the slider position corresponds to the currently displayed area of the navigational map. For example, if navigational map is updated in real-time as the aircraft travels, the center position of the graphical adjustment is automatically adjusted and/or updated such that the center position of the graphical adjustment element is updated substantially in sync with the center location of the displayed area of the navigational map and without any action on behalf of a user. In this manner, the position of the graphical adjustment element with respect to the graphical adjustment path accurately reflects the relationship of the center location of the currently displayed area of the navigational map with respect to the flight plan. The slider display process 700 determines an updated center position for the graphical adjustment element based on the instantaneous center location of the displayed area of the navigational map in a similar manner as described above (e.g., task 702). Alternatively, a user may manually reposition and/or adjust the center location of the currently displayed area of the navigational map, for example, by selecting graphical control elements 326 or otherwise manipulating the navigational map 300. In response to detecting an adjustment of the center location of the currently displayed area, the slider display process 700 determines an updated center position for the graphical adjustment element based on the updated center location of the currently displayed area of the navigational map, as described above (e.g., task 702).

Figure 8:
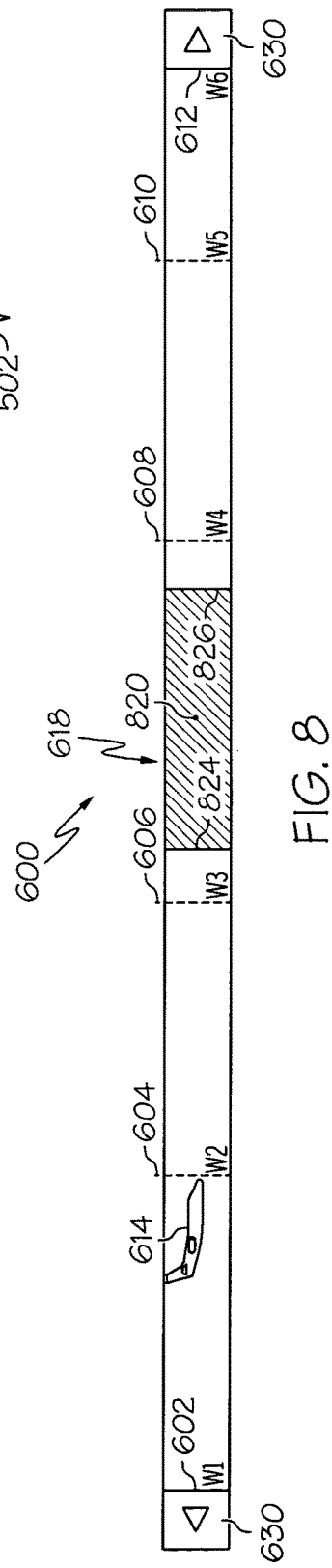
FIG. 8 depicts a scrollbar suitable for use with the display process of FIG. 2 in response to an adjustment of the slider position in accordance with one embodiment.

In a similar manner, the slider display process 700 updates and/or adjusts the navigational map in response to an adjustment of the position of the graphical adjustment element. For example, referring now to FIG. 6 and FIG. 8, a user may manually reposition and/or adjust the slider position 614 for example, by selecting graphical control elements 630, selecting and/or dragging the slider 618, or otherwise manipulating the flight plan scrollbar path 600 to reposition the slider 618 to an updated slider position 820. In an exemplary embodiment, the slider display process 700 detects an adjustment of the slider position, and in response, automatically adjusts and/or updates the currently displayed area of the navigational map such that it corresponds to the adjusted and/or updated slider position. In this regard, the slider display process 700 calculates the along track distance corresponding to the updated slider position based on the scale of the scrollbar path 600. For example, the slider display process 700 may determine the number of pixels between the updated slider position 820 and the indicia 602 for the initial navigational reference point 502 and divide the result by the scale of the flight plan scrollbar path 600 to obtain the along track distance of the flight plan 500 that corresponds to the updated slider position 820. The slider display process 700 may then determine a point 920 within the flight plan 500 having an along track distance from the initial navigational reference point 502 that corresponds to the updated slider position 820. In an exemplary embodiment, the slider display process 700 determines the updated center location for the currently displayed area 516 as the identified point 920 within the flight plan, such that the currently displayed area 516 of the navigational map is centered about the portion of the flight plan 500 that corresponds to the updated slider position 820. In accordance with one or more embodiments, the slider display process 700 may also update the vertical profile synchronously with the navigational map, such that the vertical profile reflects the portion of the flight plan within the currently displayed area. For example, the vertical profile may be updated to reflect the vertical profile for flying from a point 924 within the flight plan 500 at the trailing edge of the displayed area 516 to the a point 926 within the flight plan 500 at the leading edge of the displayed area 516. In a similar manner as set forth above, in accordance with one embodiment, the width or size of the slider 618 may be updated to reflect the along track distance for the portion of the flight plan within the displayed area 516 about the updated center location 920, such that the leading edge 826 of the slider 618 corresponds to a point 926 within the flight plan 500 at the leading edge of the currently displayed area 516 while the trailing edge 824 of the slider 618 corresponds to the a point 924 within the flight plan 500 at the trailing edge of the currently displayed area 516.

Figure 10:
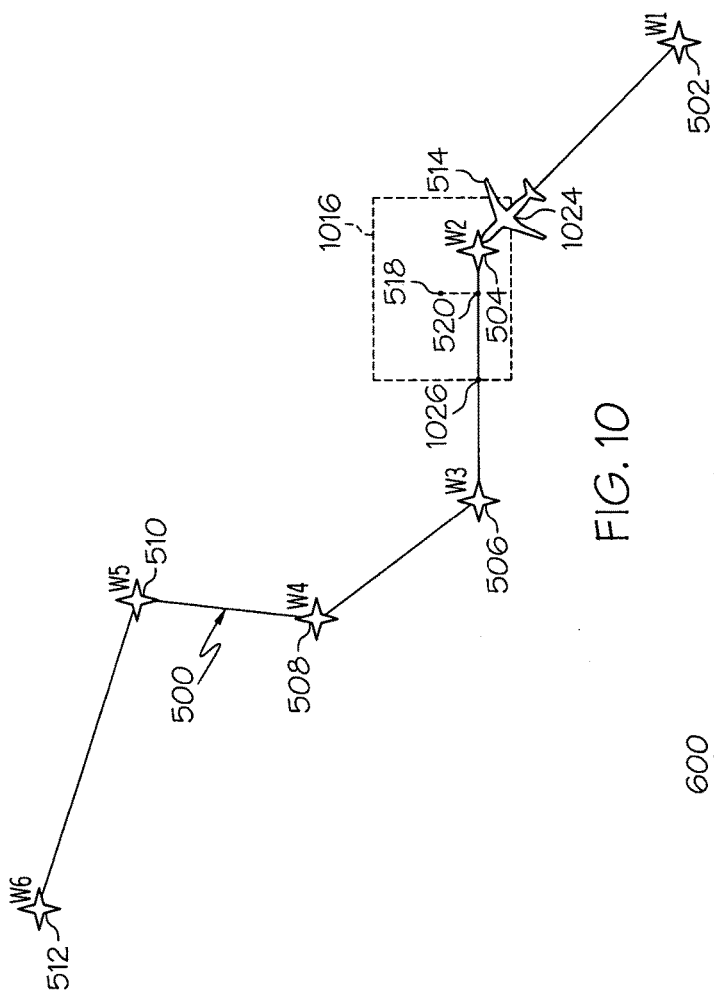
FIG. 10 depicts an updated display area with respect to the flight plan in response to an adjustment of the range setting of the navigational map suitable for use with the display process of FIG. 2 in accordance with one embodiment.
Figure 11:
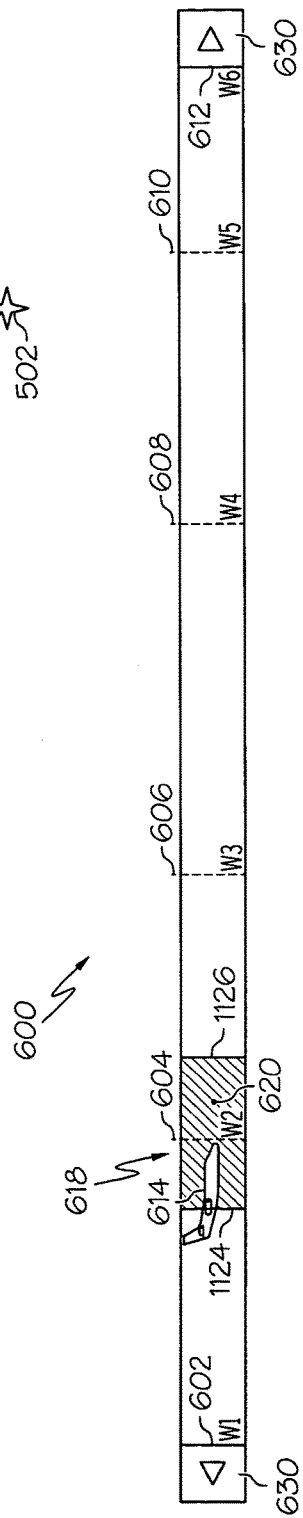
FIG. 11 depicts a scrollbar suitable for use with the display process of FIG. 2 that corresponds to the updated displayed area with respect to the flight plan of FIG. 10 in accordance with one embodiment.

In an exemplary embodiment, the slider display process 700 also updates and/or adjusts the size of the graphical adjustment element in response to an adjustment of the range setting and/or scale of the navigational map. In this regard, a user may manipulate the user interface 110 to increase and/or decrease the range setting for the navigational map. In response, the slider display process 700 increases and/or decreases the size (or width) of the graphical adjustment element such that the size of the graphical adjustment element corresponds to the size of the currently displayed area. For example, referring now to FIG. 5 and FIG. 10, a user may decrease the range setting of the navigational map to adjust the reduce the field of view and/or size of the currently displayed area 516 to a smaller geographic area 1016. Referring now to FIG. 11 and FIG. 6, in response to the reduced displayed area 1016, the slider display process 700 reduces the width of the slider 618 in a corresponding manner such that the display size or width of the slider 618 with respect to the flight plan scrollbar path 600 corresponds to the along track distance between points 1024, 1026 of the flight plan 500 that are at the edges of the currently displayed area 1016. In this regard, the slider display process 700 may calculate and/or determine the width for the slider by determining and/or calculating the along track distance for the portion of the flight plan 500 within the currently displayed area 1016 and then multiplying the along track distance for the currently displayed portion of the flight plan by the scale of the scrollbar path 600 to obtain the number of pixels (or pixel width) for the slider 618 (e.g., task 704), as described above. Thus, the number of pixels between the leading edge 1126 of the slider 618 and the trailing edge 1124 corresponds to the along track distance between the point 1026 within the flight plan 500 at the leading edge of the currently displayed area 1016 and the point 1024 within the flight plan 500 at the trailing edge of the currently displayed area 1016 multiplied by the scale of the scrollbar path 600.

One advantage of the systems and/or methods described above is that a user may use the scrollbar (e.g., slider and/or scrollbar path) to quickly and intuitively adjust the displayed area of the navigational map along the route defined by the flight plan to view information pertaining to portions of the flight plan ahead of and/or behind the current location of the aircraft. In addition, the graphical adjustment element (e.g., the slider) is positioned with respect to the graphical adjustment path (e.g., scrollbar path) in a manner that reflects the location of the currently displayed area of the navigational map with respect to the flight plan. In an exemplary embodiment, the width and/or size of the graphical adjustment element reflects the size or amount of geographic area currently displayed on the navigational map. In addition, a graphical representation of the aircraft is also displayed overlying the scrollbar which provides additional situational awareness as to the progress and/or status of the aircraft within the flight plan.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A method comprising:
   displaying a navigational map on a display device, the navigational map having a displayed area;
   displaying a graphical adjustment element on the display device, wherein:
   a position of the graphical adjustment element on the display device corresponds to an along track distance between the displayed area and a first navigational reference point of a route;
   the route comprises the first navigational reference point and a second navigational reference point; and
   the along track distance is measured along the route; and
   displaying a vertical profile on the display device, the vertical profile corresponding to the displayed area, wherein the vertical profile is automatically adjusted to correspond to a portion of the route within the displayed area in response to an adjustment of the position of the graphical adjustment element.

2. The method of claim 1, further comprising:
   displaying a graphical adjustment path on the display device, the graphical adjustment path corresponding to a second along track distance between the first navigational reference point and the second navigational reference point; and
   displaying the graphical adjustment element overlying the graphical adjustment path at a position corresponding to the along track distance between the displayed area and the first navigational reference point, such that the position of the graphical adjustment element with respect to the graphical adjustment path corresponds to the along track distance between the displayed area and the first navigational reference point.

3. The method of claim 2, wherein the method further comprises:
   identifying a point within the route that corresponds to the displayed area;
   calculating the along track distance from the point to the first navigational reference point to obtain the along track distance between the displayed area and the first navigational reference point; and determining the position of the graphical adjustment element based on a ratio of the along track distance between the displayed area and the first navigational reference point to the second along track distance between the first navigational reference point and the second navigational reference point.

4. The method of claim 3, wherein identifying the point within the route that corresponds to the displayed area comprises identifying the point within the route nearest a center location for the displayed area.

5. A method comprising:

displaying a navigational map on a display device, the navigational map having a displayed area;

displaying a graphical adjustment path on the display device, the graphical adjustment path corresponding to a first along track distance between a first navigational reference point of a route and a second navigational reference point of the route, the graphical adjustment path being displayed with a first number of pixels;

identifying a point within the route that corresponds to the displayed area;

calculating a second along track distance from the point to the first navigational reference point to obtain the second along track distance between the displayed area and the first navigational reference point;

determining a position of a graphical adjustment element based on a ratio of the second along track distance between the displayed area and the first navigational reference point to the first along track distance between the first navigational reference point and the second navigational reference point, wherein determining the position of the graphical adjustment element comprises:

determining a scale of the graphical adjustment path based on a ratio of the first number of pixels to the first along track distance between the first navigational reference point and the second navigational reference point; and calculating a second number of pixels based on the second along track distance between the displayed area and the first navigational reference point and the scale of the graphical adjustment path; and displaying a graphical adjustment element on the display device overlying the graphical adjustment path at the position corresponding to the second number of pixels, such that the position of the graphical adjustment element with respect to the graphical adjustment path corresponds to the second along track distance between the displayed area and the first navigational reference point.

6. The method of claim 2, the display device being associated with an aircraft, the method further comprising displaying a graphical representation of the aircraft overlying the graphical adjustment path, the graphical representation of the aircraft overlying the graphical adjustment path at an aircraft position corresponding to a third along track distance between a current location of the aircraft and the first navigational reference point, such that the aircraft position with respect to the graphical adjustment path corresponds to the third along track distance between the current location of the aircraft and the first navigational reference point.

7. The method of claim 2, further comprising displaying the graphical adjustment element with a display size corresponding to the displayed area.

8. The method of claim 7, wherein the method further comprises:

determining a third along track distance for a first portion of the route within the displayed area; and calculating the display size based on the third along track distance for the first portion of the route within the displayed area and a scale of the graphical adjustment path.

9. The method of claim 7, further comprising adjusting the display size in response to an adjustment of a range setting of the navigational map.

10. A method comprising:

displaying a navigational map on a display device, the navigational map having a displayed area;

displaying a graphical representation of a portion of a flight plan on the navigational map within the displayed area, the flight plan having a first navigational reference point and a second navigational reference point;

displaying a vertical profile of the portion of the flight plan on the display device;

displaying a graphical adjustment element on the display device, wherein a position of the graphical adjustment element on the display device corresponds an along track distance between the displayed area and the first navigational reference point of the flight plan; and adjusting the vertical profile of the flight plan in response to an adjustment of the position of the graphical adjustment element.

11. The method of claim 1, further comprising automatically adjusting a center location of the displayed area in response to an adjustment of the position of the graphical adjustment element, the adjustment of the position of the graphical adjustment element resulting in an updated position for the graphical adjustment element, wherein the center location corresponds to the updated position.

12. The method of claim 1, further comprising automatically adjusting the position of the graphical adjustment element with respect to the graphical adjustment path in response to an adjustment of the displayed area.

13. The method of claim 12, wherein automatically adjusting the position of the graphical adjustment element comprises:

identifying a point within the route that corresponds to the adjusted displayed area;

calculating a third along track distance from the point to the first navigational reference point to obtain the third along track distance between the adjusted displayed area and the first navigational reference point;

determining an updated position for the graphical adjustment element based on a ratio of the third along track distance between the adjusted displayed area and the first navigational reference point to the second along track distance between the first navigational reference point and the second navigational reference point; and displaying the graphical adjustment element overlying the graphical adjustment path at the updated position.

14. The method of claim 1, further comprising:

correlating the displayed area and the position of the graphical adjustment element; and correlating the vertical profile with the portion of the route within the displayed area in response to the adjustment of the graphical adjustment element.

15. The method of claim 10, further comprising correlating the displayed area of the navigational map and the position of the graphical adjustment element, wherein adjusting the vertical profile comprises correlating the vertical profile with the portion of the flight plan within the currently displayed area of the navigational map in response to adjustment of the position of the graphical adjustment element.

16. The method of claim 10, further comprising, in response to the adjustment of the position of the graphical adjustment element to an updated position:
   determining an updated portion of the flight plan having a second along track distance from the first navigational reference point corresponding to the updated position of the graphical adjustment element; and
   updating the displayed area of the navigational map to include the updated portion of the flight plan, wherein adjusting the vertical profile of the flight plan comprises displaying the vertical profile of the updated portion of the flight plan.

17. The method of claim 1, further comprising, in response to the adjustment of the position of the graphical adjustment element to an updated position:
   determining an updated portion of the route having a second along track distance from the first navigational reference point corresponding to the updated position of the graphical adjustment element; and
   updating the displayed area of the navigational map to include the updated portion of the route, wherein the vertical profile is automatically adjusted to display the vertical profile of the updated portion of the route.

18. The method of claim 1, further comprising correlating the displayed area of the navigational map and the position of the graphical adjustment element, wherein the vertical profile is automatically adjusted to display the vertical profile of the portion of the route within the currently displayed area of the navigational map in response to the adjustment of the position of the graphical adjustment element.

19. The method of claim 1, further comprising displaying a graphical adjustment path on the display device, the graphical adjustment path corresponding to a total along track distance between the first navigational reference point and the second navigational reference point measured along the route, wherein:
   the graphical adjustment element overlies the graphical adjustment path such that a center position of the graphical adjustment element corresponds to the second along track distance measured along the route between the displayed area and the first navigational reference point; and
   a width of the graphical adjustment element corresponds to a second along track distance for the portion of the route displayed within the displayed area.

20. The method of claim 1, further comprising displaying a graphical adjustment path on the display device, wherein:
   the first navigational reference point comprises an initial navigational reference point of a flight plan;
   the second navigational reference point comprises a final navigational reference point of the flight plan;
   the graphical adjustment path has a length corresponding to a total along track distance measured along the route between the initial navigational reference point of the flight plan and the final navigational reference point of the flight plan; and
   the graphical adjustment element overlies the graphical adjustment path at the position corresponding to the along track distance measured along the route between the displayed area and the initial navigational reference point of the flight plan.

\* \* \* \* \*